(No Model.)
J. V. BEEKMAN.
THROTTLE VALVE.
No. 561,556. Patented June 9, 1896.
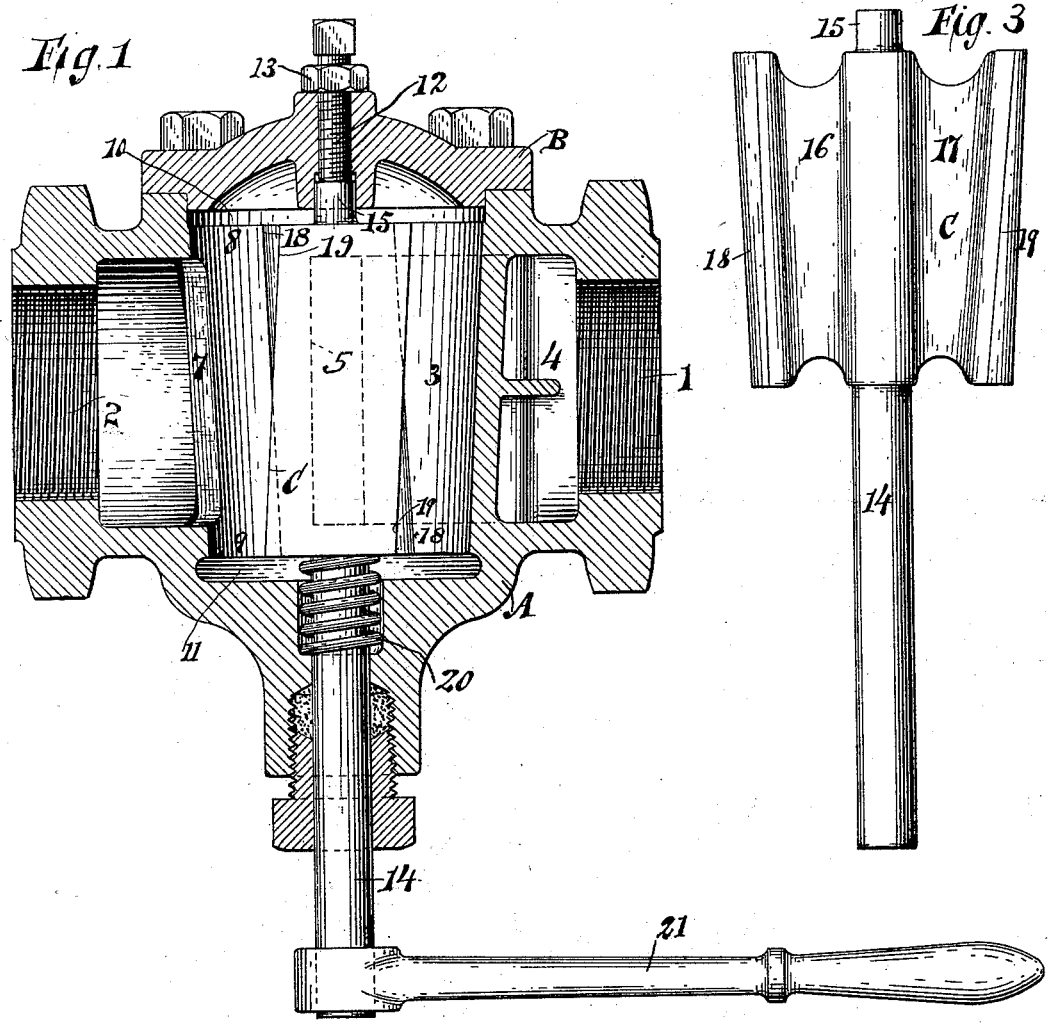
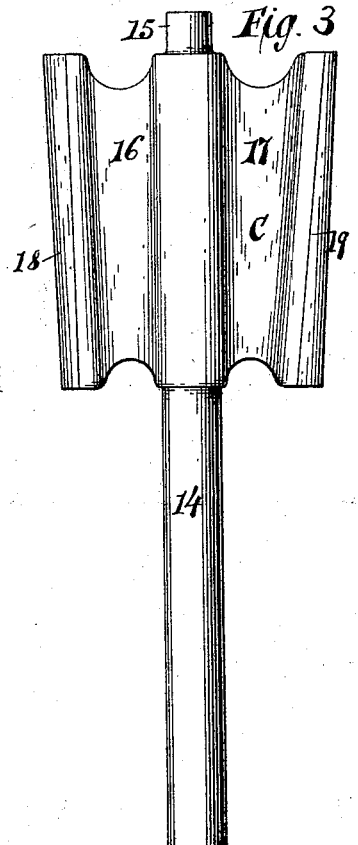
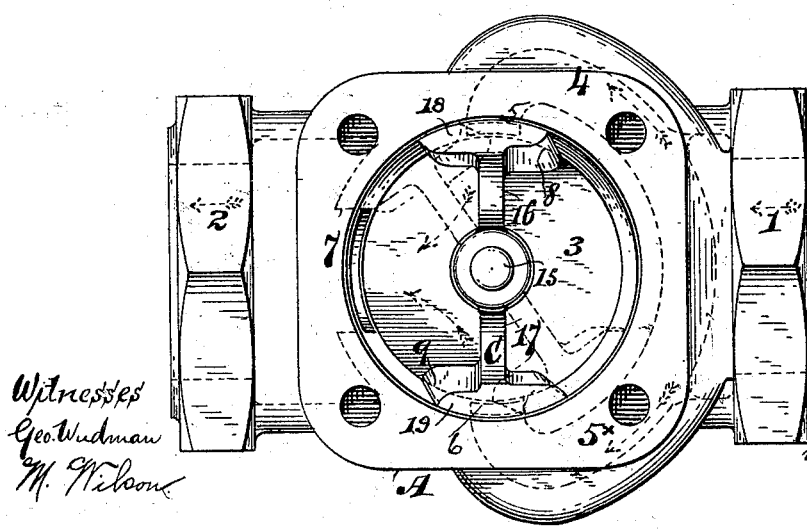
Witnesses
Geo. Wudman
M. Wilson
Inventor
John V. Beekman
by Gifford & Bull
Attys.

UNITED STATES PATENT OFFICE.

JOHN V. BEEKMAN, OF PLAINFIELD, NEW JERSEY.

THROTTLE-VALVE.

SPECIFICATION forming part of Letters Patent No. 561,556, dated June 9, 1896.

Application filed October 29, 1894. Serial No. 527,398. (No model.)

*To all whom it may concern:*

Be it known that I, JOHN V. BEEKMAN, a citizen of the United States, and a resident of Plainfield, in the county of Union and State of New Jersey, have invented certain new and useful Improvements in Throttle-Valves, of which the following is a specification.

Figure 1 of the accompanying drawings is a sectional plan view of an apparatus embodying my invention. Fig. 2 is an end view of the same with the bonnet removed. Fig. 3 is the valve proper and stem detached.

A is the valve-case.

B is the bonnet or removable cap at one end of the same.

C is the valve proper.

The construction of the case A may be described as follows: 1 is the steam-entrance opening. 2 is the steam-exit opening. 3 is the valve-cylinder, which is open at one end and tapers convergingly from the open end toward the closed end. 4 and $5^\times$ (shown in dotted lines in Fig. 2 and the form of one of which is shown in cross-section in Fig. 1) are two steam-passages leading from the inlet-passage 1, respectively to ports $5^\times$ and 6 in the cylinder 3, diametrically opposite to each other and of the oblong form shown in Fig. 1. 7 is a port connecting the cylinder 3 with the exit-passage 2. The ports 5, 6, and 7 are not as long as the valve-cylinder, so that they leave an unbroken circular bearing 8 and 9 at each end of the valve-cylinder for the valve proper. The port 7, as shown in Fig. 2, is so arranged that its central line is substantially equidistant between the ports 5 and 6. 10 and 11 are clearance-spaces. A hole extends from the clearance-space 11 through the end of the valve-case to receive the valve-stem. The clearance-spaces 10 and 11 constitute steam-passages around the ends of the valve.

The bonnet or cap B covers the open end of the valve-case and is provided with a central bearing, in which the end of the valve-stem fits. 12 is a set-screw, which is screw-threaded to the bonnet and bears against the end of the valve-stem with which it is concentric. A jam-nut 13 is provided on this set-screw.

The valve proper, C, is fixed (by being cast in one piece therewith or otherwise) upon the valve-stem 14 15, and this valve proper, C, consists of the wings or plates 16 17, projecting radially on opposite sides of the center and terminating, respectively, in the T members 18 and 19. These T members or valve-faces are formed to fit the interior of the valve-case 3, so as to revolve freely and accurately therein. The lines bounding the bearing-surface 18 are inclined in one direction with respect to a plane passing through the axis of the valve proper and the lines bounding the bearing-surface 19 are inclined in the opposite direction, as shown in the drawings, giving each bearing-surface 18 and 19 a certain amount of pitch with respect to the ports 5 and 6. 20 is a spiral spring tending to thrust the valve proper in antagonism to the set-screw 12. 21 is a lever for moving the valve-stem.

When the valve is in the position shown in full lines in Fig. 2, the steam is cut off; but when it is moved out of that position—as, for instance, into the position shown in dotted lines—the steam passes freely from the port 6 to the port 7 and from the port 5 around the ends of the valve proper to the port 7. The valve is thus surrounded by steam and always balanced.

The valve proper, as already described, is tapered and fits into the valve-case, also tapered. It is poised between the spiral spring 20 and the set-screw 12 at opposite ends, so that it can be adjusted from the outside and set while in use or at work by the adjustment of the set-screw 12. A perfectly accurate and steam-tight adjustment can thus be maintained with very little friction between the bearing-surfaces of the valve proper and of the valve-cylinder. The adjustment can be varied for different pressures. Thus it can be adjusted for forty, sixty, eighty, one hundred, or two hundred pounds, &c., as each pressure makes some slight difference in the relations of the bearing-surfaces due to expansion.

The pitch of the valve-bearing surfaces causes the ports to be opened more gradually, the opening of one port commencing at one end of the valve-cylinder, while the opening of the other port commences at the opposite end. This gives the operator a finer control of the steam and enables the engine to be run more steadily, whether it be handled by an expert or by the average man of less intelligence. Thus the engine is particularly adapted for handling loads, as in the case of hoisting or conveying engines.

What I claim is—

A balanced throttle-valve containing valve-bearing faces, substantially diametrically opposite to each other in combination with a valve-cylinder, provided with ports substantially diametrically opposite to each other, the said bearing-faces being set at a pitch relatively to the axial plane of the valve, substantially as described.

JOHN V. BEEKMAN.

Witnesses:
M. WILSON,
HARRY LYDECKER.